US012278538B2

(12) United States Patent
Mizuguchi et al.

(10) Patent No.: US 12,278,538 B2
(45) Date of Patent: Apr. 15, 2025

(54) ELECTRIC POWER UNIT AND WORKING MACHINE

(71) Applicant: HONDA MOTOR CO., LTD., Tokyo (JP)

(72) Inventors: Hiroshi Mizuguchi, Wako (JP); Kazuhisa Fujiwara, Wako (JP); Nobuyuki Kaneko, Wako (JP); Naoki Matsunaga, Wako (JP); Toru Yuki, Wako (JP); Shota Shimotani, Wako (JP); Ayame Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 651 days.

(21) Appl. No.: 17/185,567

(22) Filed: Feb. 25, 2021

(65) Prior Publication Data

US 2021/0184535 A1 Jun. 17, 2021

Related U.S. Application Data

(63) Continuation of application No. PCT/JP2018/032632, filed on Sep. 3, 2018.

(51) Int. Cl.
*H02K 5/04* (2006.01)
*H01M 50/202* (2021.01)
*H02K 9/04* (2006.01)

(52) U.S. Cl.
CPC .............. *H02K 5/04* (2013.01); *H02K 9/04* (2013.01); *H01M 50/202* (2021.01)

(58) Field of Classification Search
CPC .......... H02K 5/04; H02K 9/04; H01M 50/202
See application file for complete search history.

(56) References Cited

U.S. PATENT DOCUMENTS

| 4,452,417 A | * | 6/1984 | Krafthefer ............ F16F 1/3732 248/635 |
| 6,593,674 B2 | | 7/2003 | Sanchez et al. |
| 7,007,446 B2 | | 3/2006 | Dettmann |
| 7,434,642 B2 | | 10/2008 | Dettmann |
| 7,675,207 B2 | | 3/2010 | Kasai |
| 7,682,102 B1 | | 3/2010 | Burke et al. |
| 9,254,871 B2 | | 2/2016 | Hotta et al. |

(Continued)

FOREIGN PATENT DOCUMENTS

| CN | 101436814 A | 5/2009 |
| CN | 103370230 A | 10/2013 |

(Continued)

OTHER PUBLICATIONS

EP Office Action for EP Application No. 18897862.1 mailed May 17, 2021.

(Continued)

*Primary Examiner* — Tulsidas C Patel
*Assistant Examiner* — Robert E Mates
(74) *Attorney, Agent, or Firm* — Thomas | Horstemeyer, LLP

(57) ABSTRACT

The present invention provides an electric power unit that is mounted on a mounting object, comprising a motor; and electrical equipment for driving the motor, wherein the motor has a first attachment portion that is attached to the mounting object, and a second attachment portion to which the electrical equipment is attached.

10 Claims, 17 Drawing Sheets

(56) References Cited

U.S. PATENT DOCUMENTS

| | | | |
|---|---|---|---|
| 9,273,697 B2 | 3/2016 | Cardo | |
| 9,287,751 B2 | 3/2016 | Naito et al. | |
| 9,621,010 B2 | 4/2017 | Stillger et al. | |
| 9,790,662 B2 | 10/2017 | Ota et al. | |
| 10,439,465 B2 | 10/2019 | Kaneko et al. | |
| 2002/0117908 A1 | 8/2002 | Sanchez et al. | |
| 2003/0037524 A1 | 2/2003 | Iida et al. | |
| 2005/0072132 A1 | 4/2005 | Dettmann | |
| 2006/0096266 A1 | 5/2006 | Dettmann | |
| 2009/0127952 A1 | 5/2009 | Kasai | |
| 2012/0080254 A1* | 4/2012 | Tsukamoto | B62J 6/01 180/68.5 |
| 2013/0270862 A1 | 10/2013 | Hotta et al. | |
| 2014/0084718 A1 | 3/2014 | Naito et al. | |
| 2014/0154098 A1 | 6/2014 | Cardo | |
| 2014/0306559 A1 | 10/2014 | Stillger et al. | |
| 2016/0105083 A1* | 4/2016 | Ishimaru | H02K 5/22 310/54 |
| 2016/0296091 A1 | 10/2016 | Seo | |
| 2017/0016206 A1 | 1/2017 | Ota et al. | |
| 2017/0271941 A1* | 9/2017 | Kaneko | H02K 9/06 |

FOREIGN PATENT DOCUMENTS

| | | |
|---|---|---|
| CN | 103843231 A | 6/2014 |
| CN | 106103850 A | 11/2016 |
| CN | 107196460 A | 9/2017 |
| CN | 107567824 A | 1/2018 |
| EP | 1235329 A2 | 8/2002 |
| EP | 2712712 A2 | 4/2014 |
| EP | 3081131 A1 | 10/2016 |
| EP | 3220518 A1 | 9/2017 |
| JP | H0742367 U | 8/1995 |
| JP | 2001327113 A | 11/2001 |
| JP | 2003061432 A | 3/2003 |
| JP | 2003061433 A | 3/2003 |
| JP | 2003129911 A | 5/2003 |
| JP | 2011078258 A | 4/2011 |
| JP | 2015131600 A | 7/2015 |
| JP | 2016091452 A | 5/2016 |
| JP | 2016092933 A | 5/2016 |
| JP | 2017169338 A | 9/2017 |
| JP | 2018064310 A | 4/2018 |
| TW | I239805 B | 9/2005 |
| TW | M526804 U | 8/2016 |
| WO | 2020049617 A1 | 3/2020 |

OTHER PUBLICATIONS

Communication Pursuant to Article 94(3) EPC received for EP Application No. 18897862.1 mailed Nov. 18, 2020.
The Extended European Search Report received for EP Application No. 18897862.1 mailed Mar. 10, 2020.
International Search Report for PCT/JP2018/032632 mailed Nov. 6, 2018.
Chinese Office Action for Chinese Patent Application No. 201880096866.3 mailed May 23, 2023 (partially translated).
Chinese Office Action for Chinese Patent Application No. 201880096866.3 mailed May 15, 2024 (partially translated).

* cited by examiner

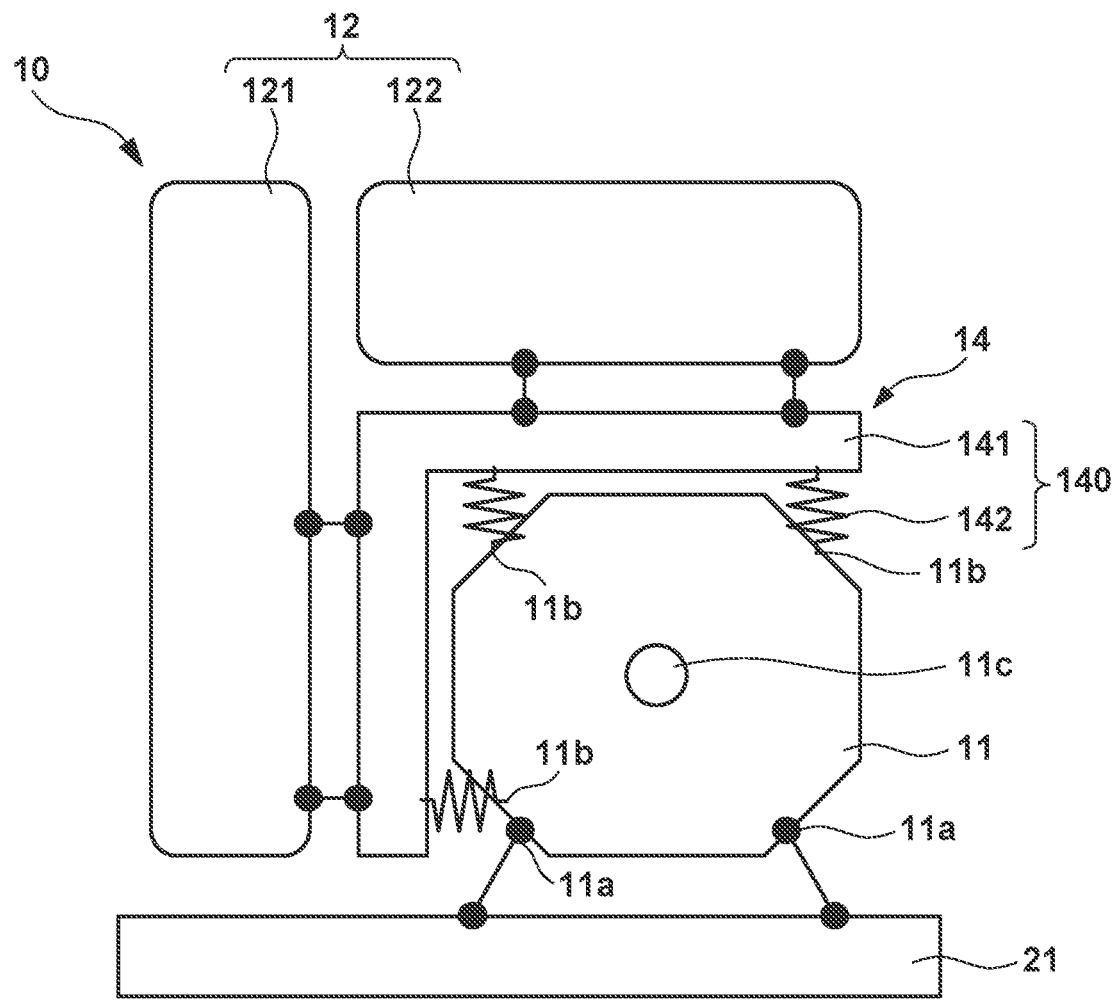

F I G. 10B
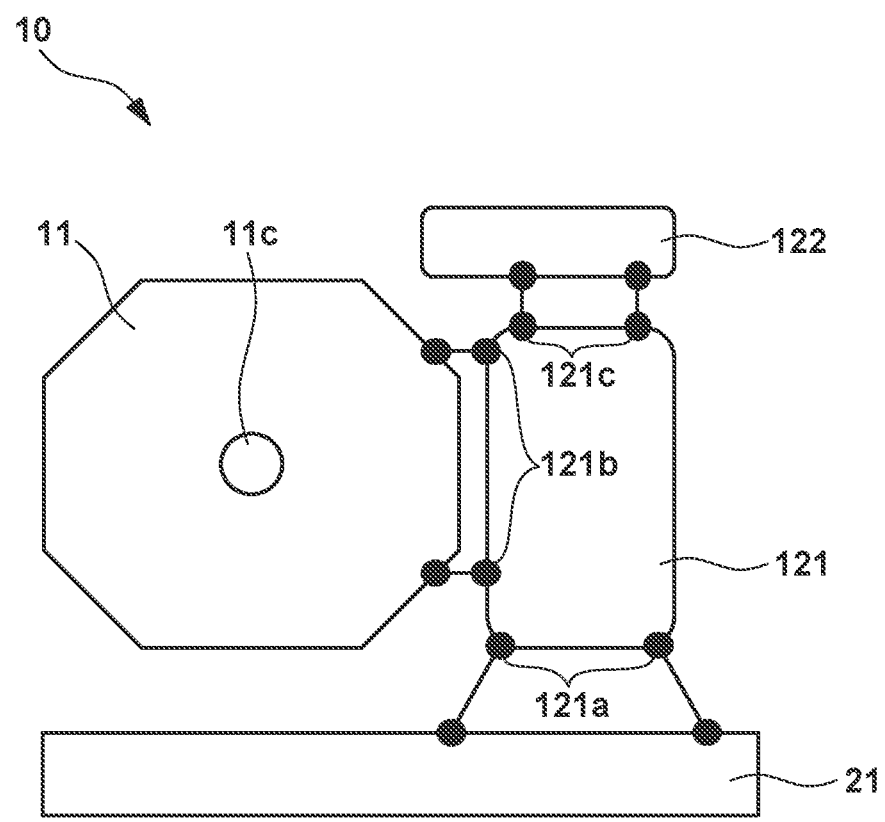

ELECTRIC POWER UNIT AND WORKING MACHINE

CROSS-REFERENCE TO RELATED APPLICATION(S)

This application is a continuation of International Patent Application No. PCT/JP2018/032632 filed on Sep. 3, 2018, the entire disclosures of which are incorporated herein by reference.

BACKGROUND OF THE INVENTION

Field of the Invention

The present invention relates to an electric power unit, and a working machine.

Description of the Related Art

Japanese Utility Model Laid-Open No. 7-42367 discloses a plate compactor using an engine as a drive source.

In recent years, with rise of exhaust gas regulations, environmental regulations and the like, there has been a growing need for using an electric power unit as a drive source, in a construction machine such as a plate compactor, and a working machine such as a lawn mower. Such an electric power unit is preferably mountable on various types of working machines, and there is a demand for compactness and enhanced versatility.

Therefore, an object of the present invention is to provide an electric power unit, which makes it possible to provide compactness and enhanced versatility.

SUMMARY OF THE INVENTION

According to the present invention, there is provided an electric power unit that is mounted on a mounting object, comprising a motor; and electrical equipment for driving the motor, wherein the motor has a first attachment portion that is attached to the mounting object, and a second attachment portion to which the electrical equipment is attached.

Further features of the present invention will become apparent from the following description of exemplary embodiments (with reference to the attached drawings).

BRIEF DESCRIPTION OF THE DRAWINGS

FIG. 6 is a view showing a schematic disposition example (modified example) of the motor, the battery, and the control unit.

FIG. 10B is a view showing a schematic disposition example (modified example) of the motor, the battery, and the control unit.

DESCRIPTION OF THE EMBODIMENTS

Hereinafter, with reference to the accompanying drawings, embodiments of the present invention will be described. Note that the respective drawings are schematic views showing structures and configurations of the embodiments, and sizes of the respective members which are illustrated do not always reflect real sizes. Further, the same elements are assigned with identical reference signs in the respective drawings, and explanation on redundant contents in the present description will be omitted.

First Embodiment

Figure 1:
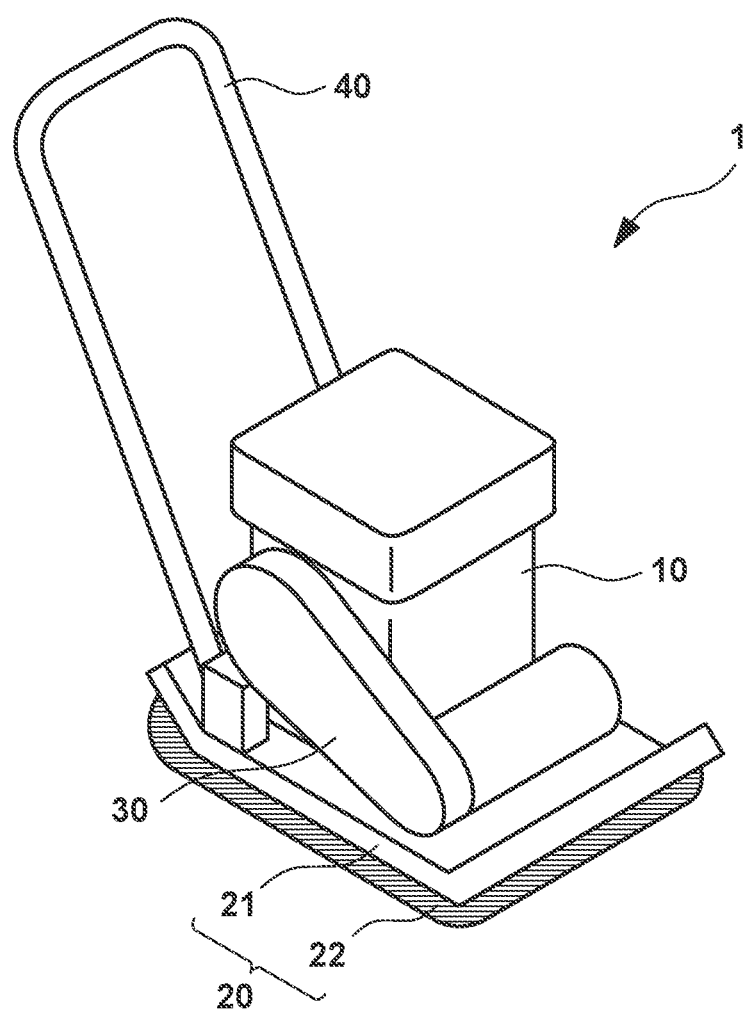
FIG. 1 is a view showing a configuration example of a working machine.

A working machine 1 of an embodiment according to the present invention will be described. FIG. 1 is a view showing a configuration example of the working machine 1 of the present embodiment. The working machine 1 of the present embodiment is a working machine (electric working machine) including an electric power unit 10 having a motor 11 and electrical equipment 12 that drives the motor 11. While examples of the working machine 1 include a plate compactor, a rammer, a lawn mower, a tiller, a snowplow, and the like, explanation hereinafter will be made with a plate compactor as an example. The working machine 1 includes, for example, the electric power unit 10, a working unit 20 (working mechanism), a power transmission mechanism 30, and an operation handle 40.

The electric power unit 10 has the motor 11, and the electrical equipment 12 that drives the motor 11. The electrical equipment 12 can include, for example, a battery 121, and a control unit 122 that uses electric power of the battery 121 to control the motor 11 to be driven. The control unit 122 is a PDU (power drive unit) in the present embodiment, but may be configured to include a processor represented by a CPU, a storage device such as a semiconductor memory, an interface with an external device, and the like. A specific configuration of the electric power unit 10 will be described later.

The working unit 20 (working mechanism) is a unit for carrying out predetermined work, and is a main body unit of the working machine 1. The working unit 20 of the present embodiment is a unit that carries out rolling compaction work to solidify the ground, and can include the base 21 that is an object (mounting object) on which the electric power unit 10 is mounted, and a rolling compaction plate 22 that is provided under the base 21. The rolling compaction plate 22 is a plate in contact with the ground, and is configured to be movable up and down.

The power transmission mechanism 30 is a mechanism that converts rotational power generated by the electric power unit 10 (motor 11) into power for moving the rolling compaction plate 22 up and down to transmit the power to the working unit 20. The power of the electric power unit 10 is transmitted to the working unit 20 (rolling compaction plate 22) by the power transmission mechanism 30, and thereby rolling compaction work of moving the rolling compaction plate 22 up and down, and solidifying the ground can be performed. Further, the operation handle 40 is formed in a bar shape so that a user can grasp the operation handle 40 in a standing position. Thereby, the user can perform rolling compaction work while pushing the working machine 1 via the operation handle 40.

[Configuration Example of Electric Power Unit]

Next, a configuration example of the electric power unit 10 of the present embodiment will be described. In recent years, there has been a growing need for using the electric power unit 10 having the motor 11 as the drive source, in a working machine, so that compactness and enhanced versatility of the electric power unit 10 are required so that the electric power unit 10 can be mounted on various types of working machines. Accordingly, the electric power unit 10 of the present embodiment is configured such that only the motor 11 is attached to the base 21 (mounting object), and the electrical equipment 12 is mounted to the motor 11. Specifically, the motor 11 is provided with a first attachment portion 11a that is attached to the base 21 (mounting object), and a second attachment portion 11b to which the electrical equipment 12 is attached.

The configuration described above enables the motor 11 and the electrical equipment 12 to be attached to and detached from the base 21 in a state where the motor 11 and the electrical equipment 12 are integrated, so that it becomes unnecessary to change the shape or the like of the electrical equipment 12 in accordance with a shape of an attachment portion which is provided at the base 21, and newly provide an attachment portion for attaching the electrical equipment 12, for the base 21, and enhancement of versatility of the electric power unit 10 can be realized. Further, the motor 11 and the electrical equipment 12 can be integrated without considering attachment of the electrical equipment 12 onto the base 21, so that compactness of the electric power unit 10 can be also realized.

Hereinafter, a specific configuration example of the electric power unit 10 of the present embodiment will be described with reference to the drawings. Note that in the drawing shown below, directions that are orthogonal to each other on a surface parallel with a horizontal direction are taken as an X-direction and a Y-direction, and a direction parallel with the vertical direction is taken as a Z-direction.

Figure 2A:
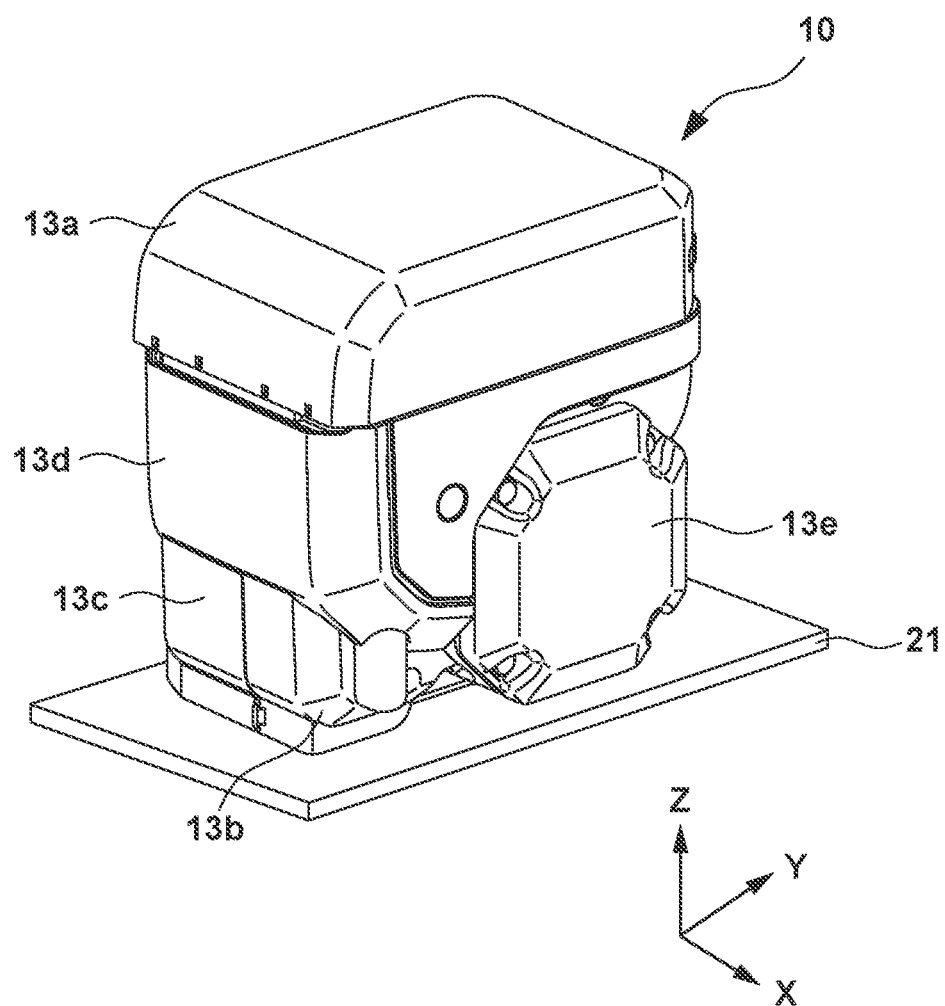
FIG. 2A is an external view (perspective view) of an electric power unit.
Figure 2B:
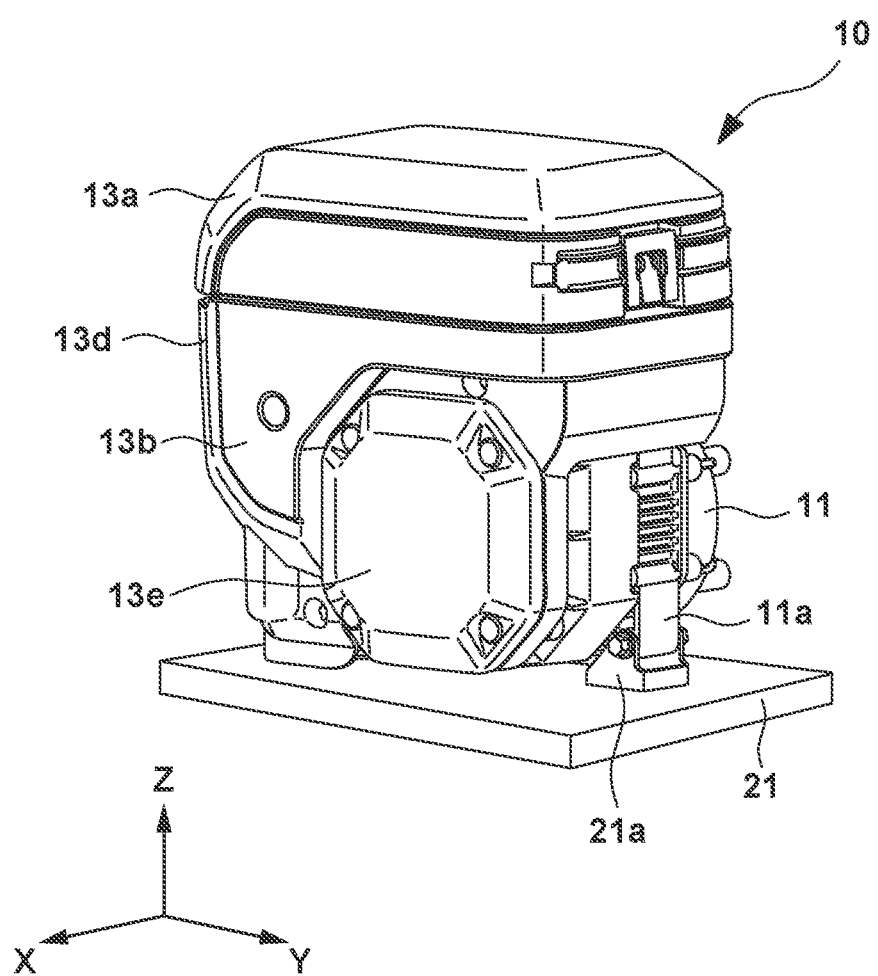
FIG. 2B is an external view (perspective view) of the electric power unit.
Figure 2C:
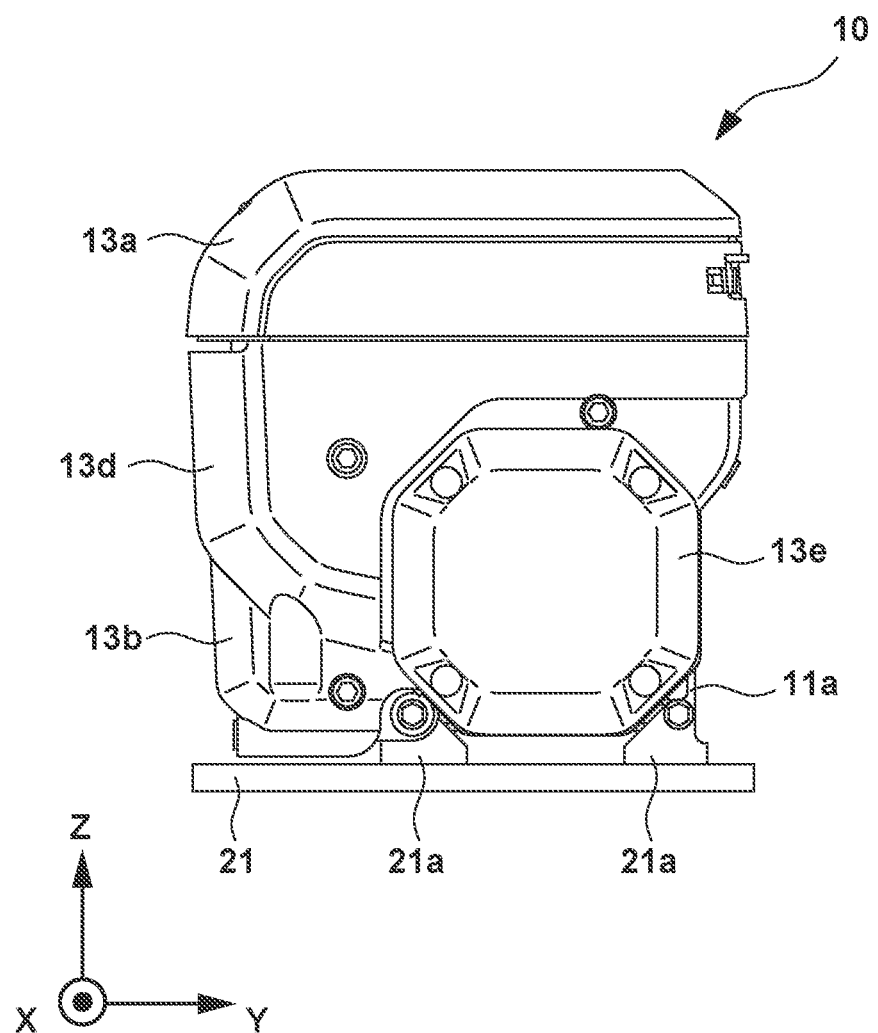
FIG. 2C is an external view (view seen from a front) of the electric power unit.
Figure 2D:
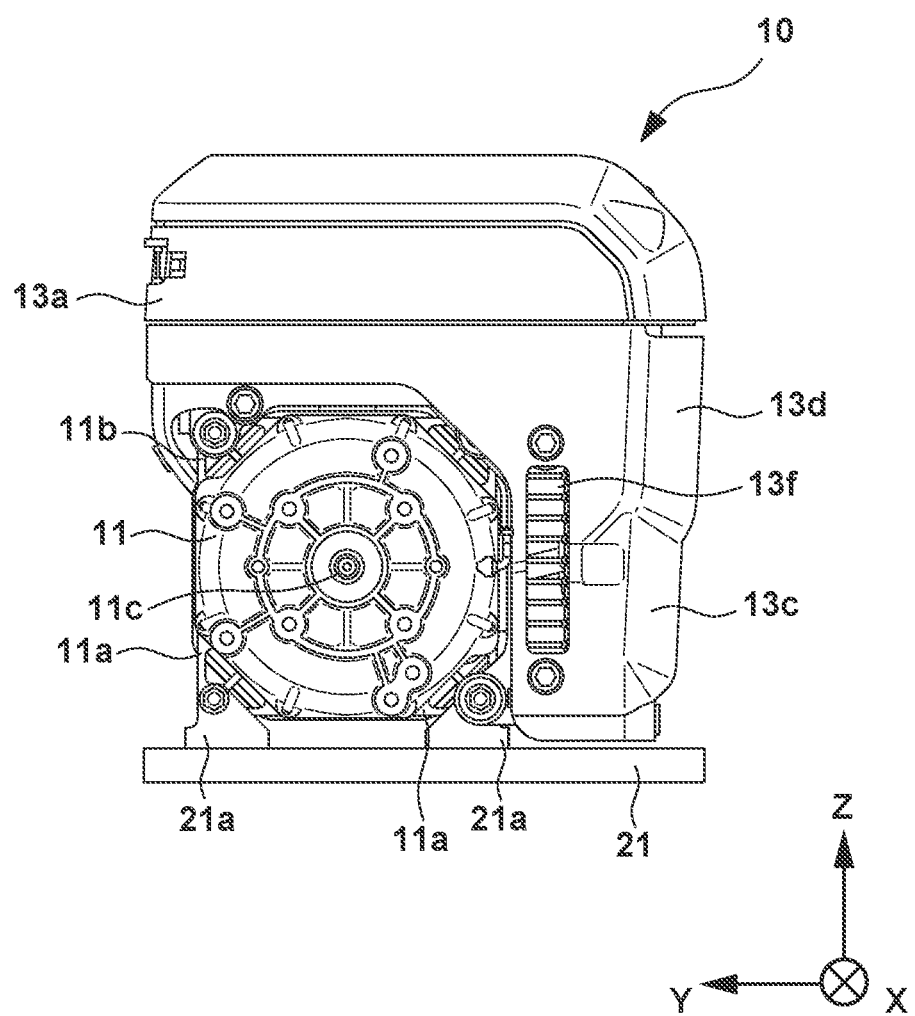
FIG. 2D is an external view (view seen from a rear) of the electric power unit.
Figure 2E:
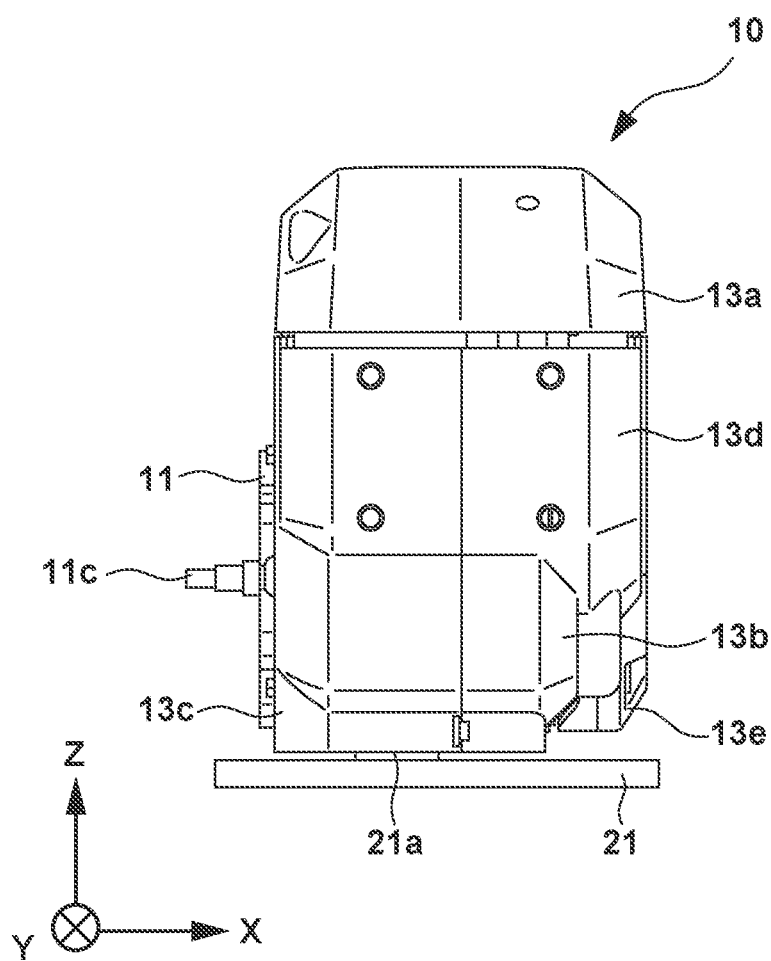
FIG. 2E is an external view (view seen from a side) of the electric power unit.

FIG. 2A to FIG. 2E are external views of the electric power unit 10 of the present embodiment. FIG. 2A and FIG. 2B show perspective views of the electric power unit 10, FIG. 2C shows a view of the electric power unit 10 seen from a front (+X-direction side), FIG. 2D shows a view of the electric power unit 10 seen from a rear (−X-direction side), and FIG. 2E shows a view of the electric power unit 10 seen from a side (−Y-direction side). As shown in FIG. 2A to FIG. 2E, the electric power unit 10 of the present embodiment is configured such that in order to prevent water from an outside for example, the electrical equipment 12 (a battery 121, a control unit 122) is covered with a cover 13, and the motor 11 is attached to a plurality (two in the present embodiment) of attachment receiving portions 21a provided at the base 21 (mounting object).

Figure 3:
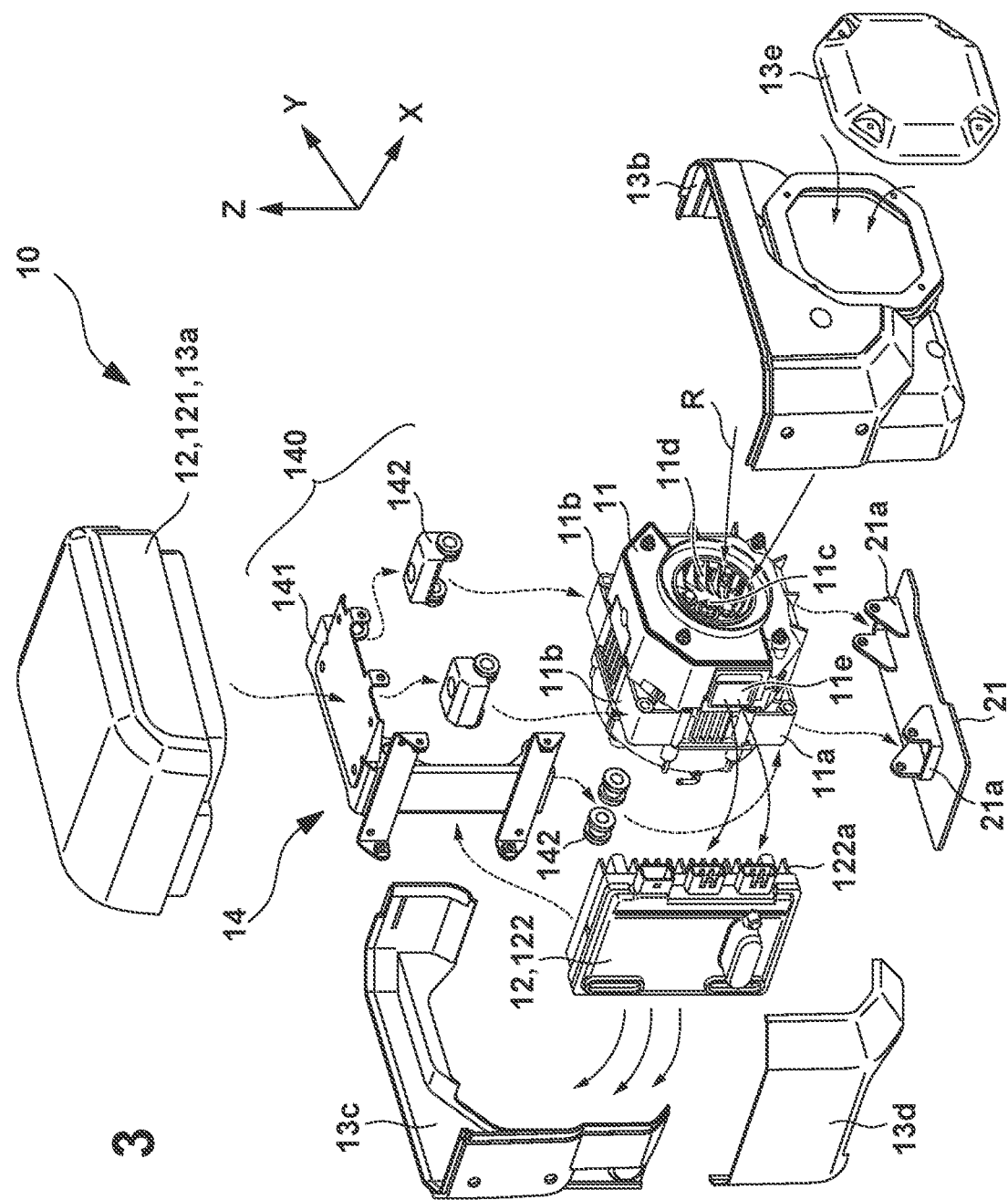
FIG. 3 is an exploded view of the electric power unit.

Here, the cover 13 of the present embodiment can be made up of a plurality of cover components 13a to 13e, as is understandable from FIG. 3 shown below. The cover component 13a (housing) is configured to cover the battery 121. A cover component 13b is configured to cover a +X-direction side of the motor 11 and the control unit 122, and a cover component 13c is configured to cover a −X-direction side of the motor 11 and the control unit 122. A cover component 13d is configured to be attached to a −Y-direction side of the cover components 13b and 13c when the cover components 13b and 13c are integrated. Further, the cover component 13e is attached to the cover component 13b so as to cover a gas intake port of a cooling fan of the motor 11.

FIG. 3 is an exploded view of the electric power unit 10 of the present embodiment, and shows a view of the electric power unit 10 seen from the same direction as in FIG. 2A. As described above, the electric power unit 10 can include the motor 11 and the electrical equipment 12 (the battery 121, the control unit 122 (PDU)). The motor 11 is provided with a first attachment portion 11a that is attached to an attachment receiving portion 21a of the base 21, and a second attachment portion 11b to which the electrical equipment 12 is attached. In the present embodiment, the first attachment portions 11a are provided at two locations on a bottom side of the motor 11, and the second attachment portions 11b are provided at two locations on a top side of the motor 11. FIG. 2 illustrates a battery unit of a configuration in which the battery 121 is housed in the cover 13a (housing), and hereinafter, the battery unit may be simply referred to as the battery 121.

Figure 4A:
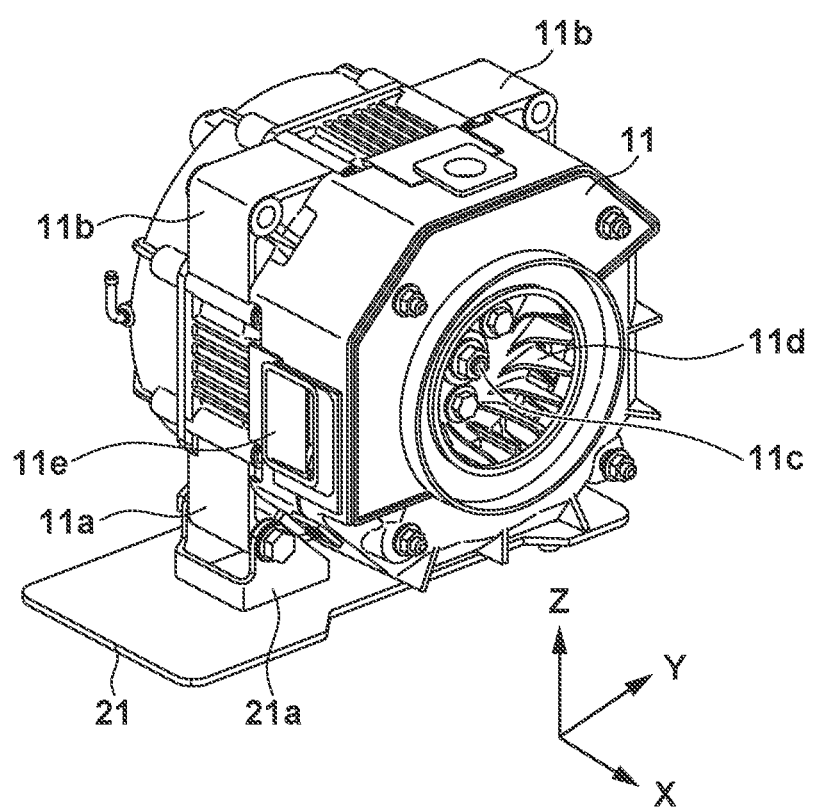
FIG. 4A is a view showing a motor mounted on a base.
Figure 4B:
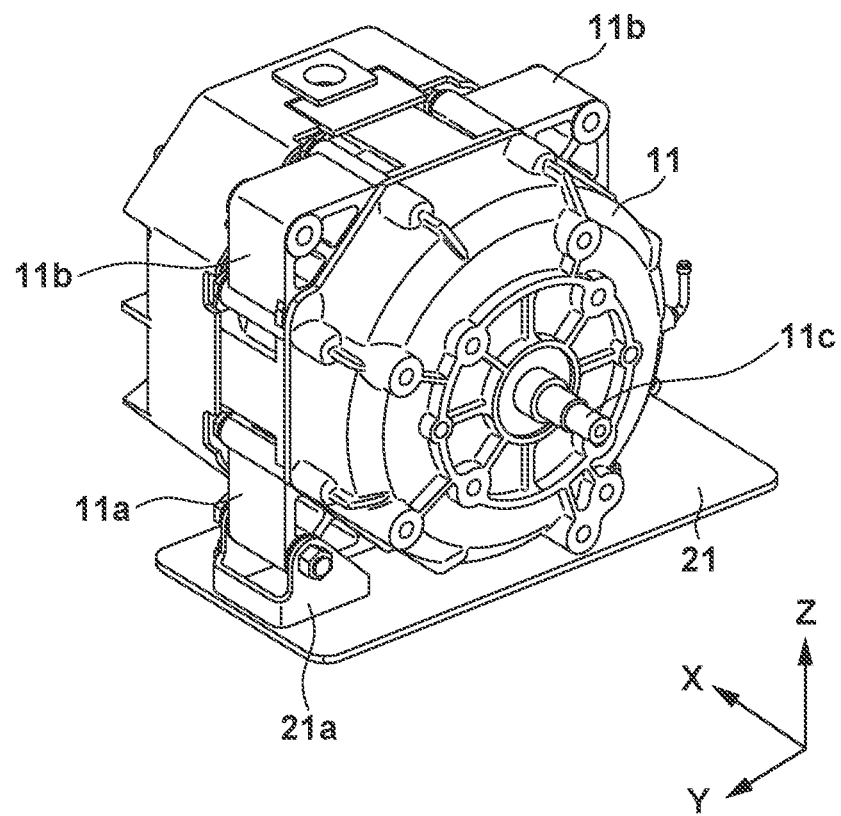
FIG. 4B is a view showing the motor mounted on the base.

The motor 11 is directly attached (fixed) to the base 21 by attaching the first attachment portions 11a which is provided at the bottom side to the attachment receiving portions 21a of the base 21 with screws or the like. That is to say, the motor 11 is rigidly coupled with the base 21. FIG. 4A and FIG. 4B are views each showing the motor 11 that is attached to the base 21. FIG. 4A is a perspective view from a direction in which the first attachment portion 11a at a −Y-direction side is visible, of the plurality of first attachment portions 11a provided at the motor 11, and FIG. 4B is a perspective view from a direction in which the first attachment portion 11a at a +Y-direction side is visible. Further, the first attachment portion 11a can be directly attached to the attachment receiving portion 21a of the base 21 with a screw or the like without an aid of a vibration isolation mechanism such as an elastic member (for example, rubber) as shown in FIG. 4A and FIG. 4B, so that a relative position of the motor 11 (a shaft unit 11c) and the working unit 20 that are connected to each other by the power transmission mechanism 30 does not vary.

The electrical equipment 12 is attached to the second attachment portion 11b of the motor 11 with a screw or the like via the vibration isolation mechanism 14 to be separated (apart, isolated) from the base 21 so as not to connect to (contact, be coupled with) the base 21. That is to say, in the electric power unit 10 of the present embodiment, only the motor 11 is attached to the base 21, and the electrical equipment 12 is only attached to the motor 11 but is not directly attached to the base 21.

Here, though not illustrated, the motor 11 and the electrical equipment 12 (the battery 121, the control unit 122) are connected by a cable for transmitting a control signal from the control unit 122, and transferring electric power of the battery 121. Further, the battery 121 and the control unit 122 as the electrical equipment 12 are also connected by the cable for transmitting a control signal from the control unit 122, and transferring the electric power of the battery 121.

The vibration isolation mechanism 14 includes a support member 140 that supports the electrical equipment 12 swingably to the motor 11 so as to suppress vibration generated in the working unit 20 (the base 21) and the motor 11 from being transmitted to the electrical equipment 12. The support member 140 can include a frame 141 to which the electrical equipment 12 is fixed, and an elastic member 142, for example. To the frame 141, the battery 121 and the control unit 122 as the electrical equipment 12 are fixed with screws or the like. Further, in the frame 141, a portion to be attached that is attached to the second attachment portion 11b of the motor 11 is formed, and the portion to be attached is attached to the second attachment portion 11b of the motor 11 via the elastic member 142, whereby the electrical equipment 12 is attached to the motor 11. The elastic member 142 is a member that is disposed between the portion to be attached of the frame 141 and the second attachment portion 11b of the motor 11 when the portion to be attached of the frame 141 is attached to the second attachment portion 11b of the motor 11, and can be formed of, for example, a rubber, gum, or the like.

[Disposition Example of Respective Components of Electric Power Unit]

Figure 5A:
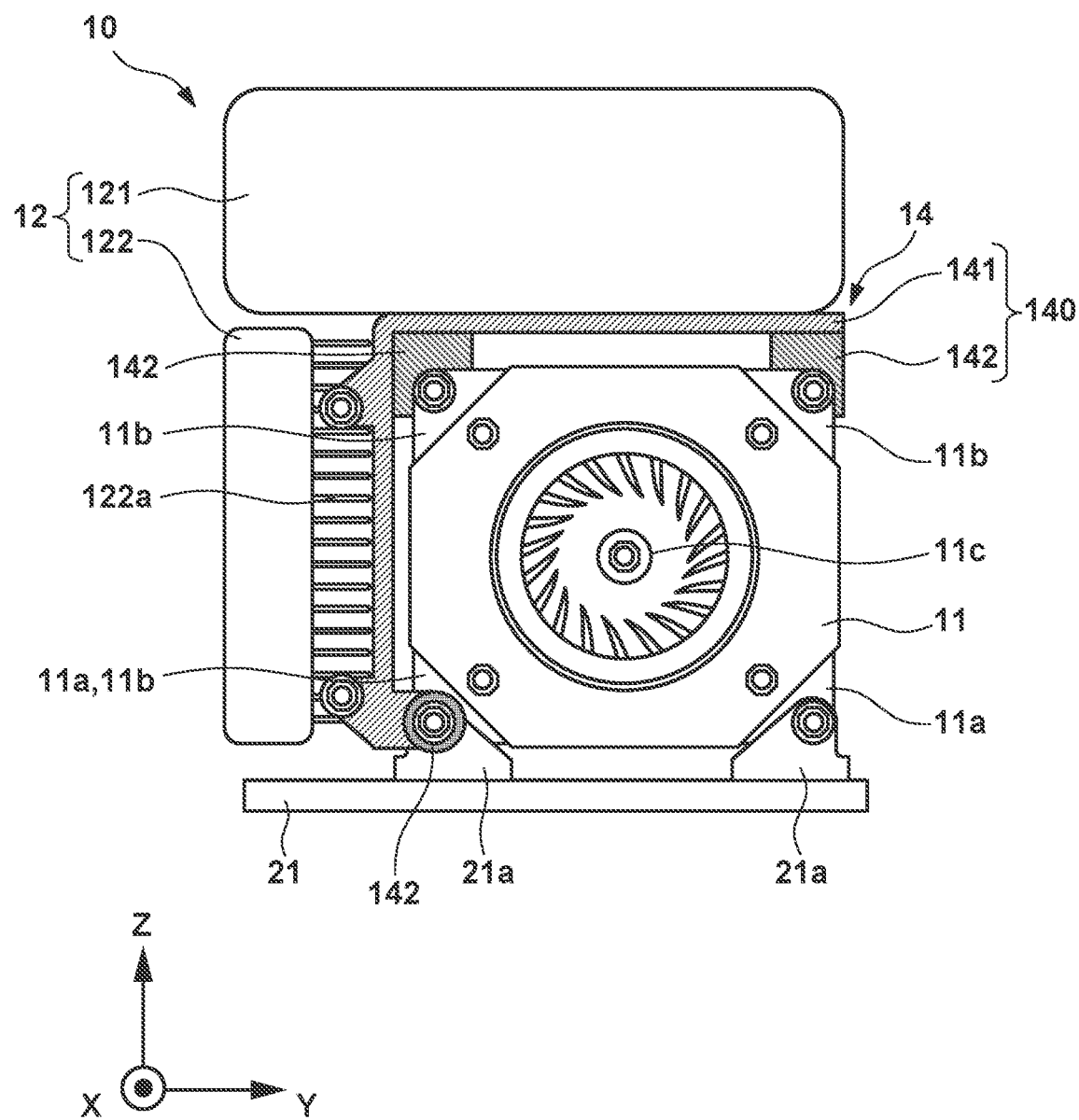
FIG. 5A is a view showing the electric power unit in a state where a cover is removed.
Figure 5B:
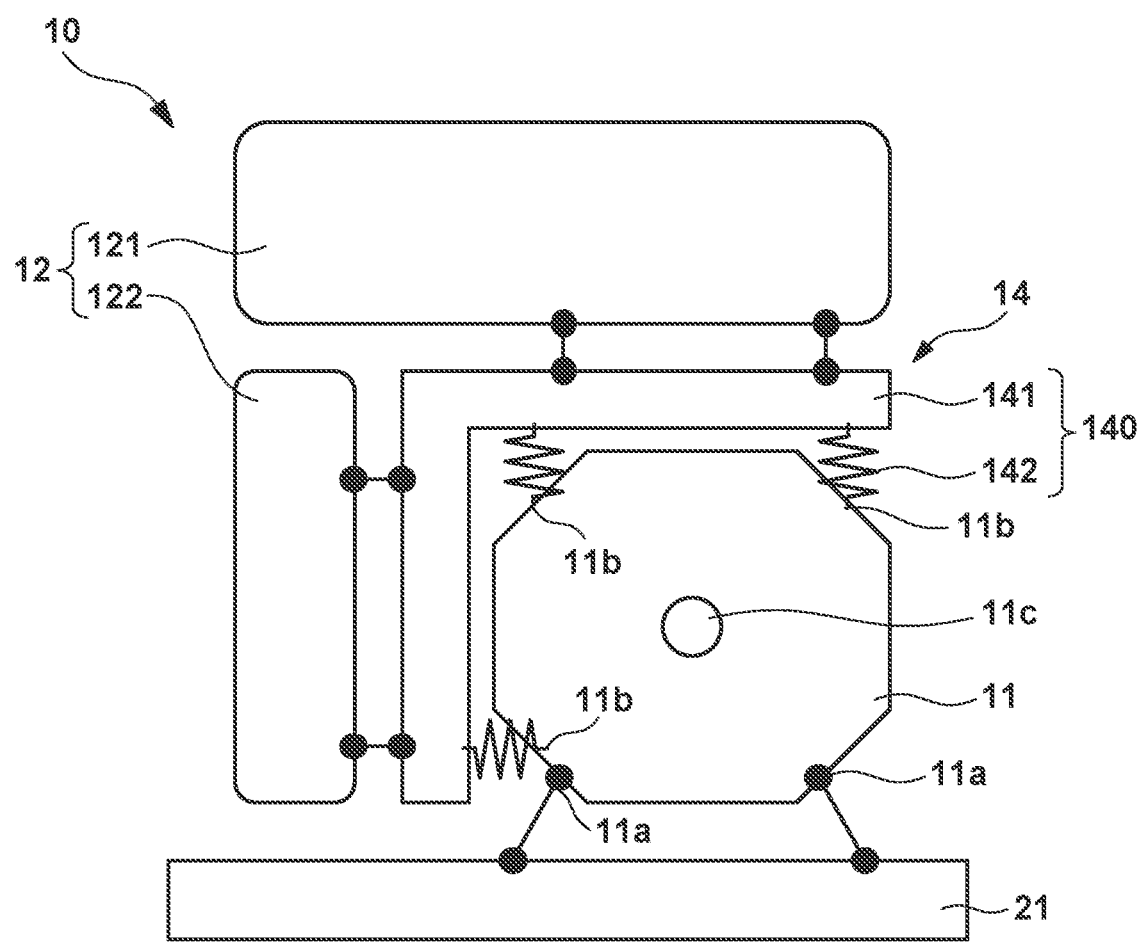
FIG. 5B is a view showing a schematic disposition example of the motor, a battery, and a control unit.

Next, disposition of the motor 11, the battery 121, and the control unit 122 in the electric power unit 10 will be described. FIG. 5A and FIG. 5B are views each showing a disposition example of the motor 11, the battery 121, and the control unit 122 in the electric power unit 10. FIG. 5A shows a state where the cover 13 of the electric power unit shown in FIG. 2C is removed, and FIG. 5B shows a schematic disposition example of the motor 11, the battery 121, and the control unit 122.

As shown in FIG. 5A and FIG. 5B, the motor 11 is fixed to (rigidly coupled with) the base 21 by the first attachment portions 11a of the motor 11 being attached to the attachment receiving portions 21a of the base 21 with screws or the like. Further, the support member 140 for supporting the electrical equipment 12 is attached to the motor 11. Specifically, the support member 140 has the frame 141 and the elastic member 142 as described above, and the portion to be attached of the frame 141 is attached to the second attachment portion 11b of the motor 11 via the elastic member 142. In the example shown in FIG. 5A and FIG. 5B, the support member 140 is attached to the motor 11 in the attachment portions at three locations, and the first attachment portion 11a on the −Y-direction side of the plurality of first attachment portions 11a provided at the motor 11 also has a function as the second attachment portion 11b.

The battery 121 as the electrical equipment 12 is disposed above the motor 11, and is attached to the frame 141 by a screw or the like to be fixed. That is to say, the battery 121 is attached to an upper portion of the motor 11 via the support member 140. The control unit 122 as the electrical equipment 12 is disposed at a side portion of the motor 11, and is attached to the frame 141 by a screw or the like to be fixed. That is to say, the control unit 122 is attached to the side portion of the motor 11 via the support member 140. Further, a side portion of the motor 11 on an opposite side from the side portion to which the control unit 122 is attached is preferably exposed with nothing disposed on the side portion, from a viewpoint of cooling (air cooling) of the motor 11.

The electric power unit 10 of the present embodiment is configured such that of the battery 121 and the control unit 122 as the electrical equipment 12, the battery 121 which is a heavier component is attached to the upper portion of the motor 11, and the control unit 122 which is a lighter component is attached to the side portion of the motor 11. According to the configuration described above, in the horizontal direction (for example, the Y-direction), the center of gravity in the entire electric power unit 10 can be brought close to the shaft unit 11c (rotating shaft) of the motor 11, so that shake of the electric power unit 10 while working with the working machine 1 is prevented, and working stability can be enhanced. However, other than the configuration described above, such a configuration that the battery 121 is attached to the side portion of the motor 11, and the control unit 122 is attached to the upper portion of the motor 11 as shown in FIG. 6 may be adopted as long as working stability can be ensured.

Figure 7:
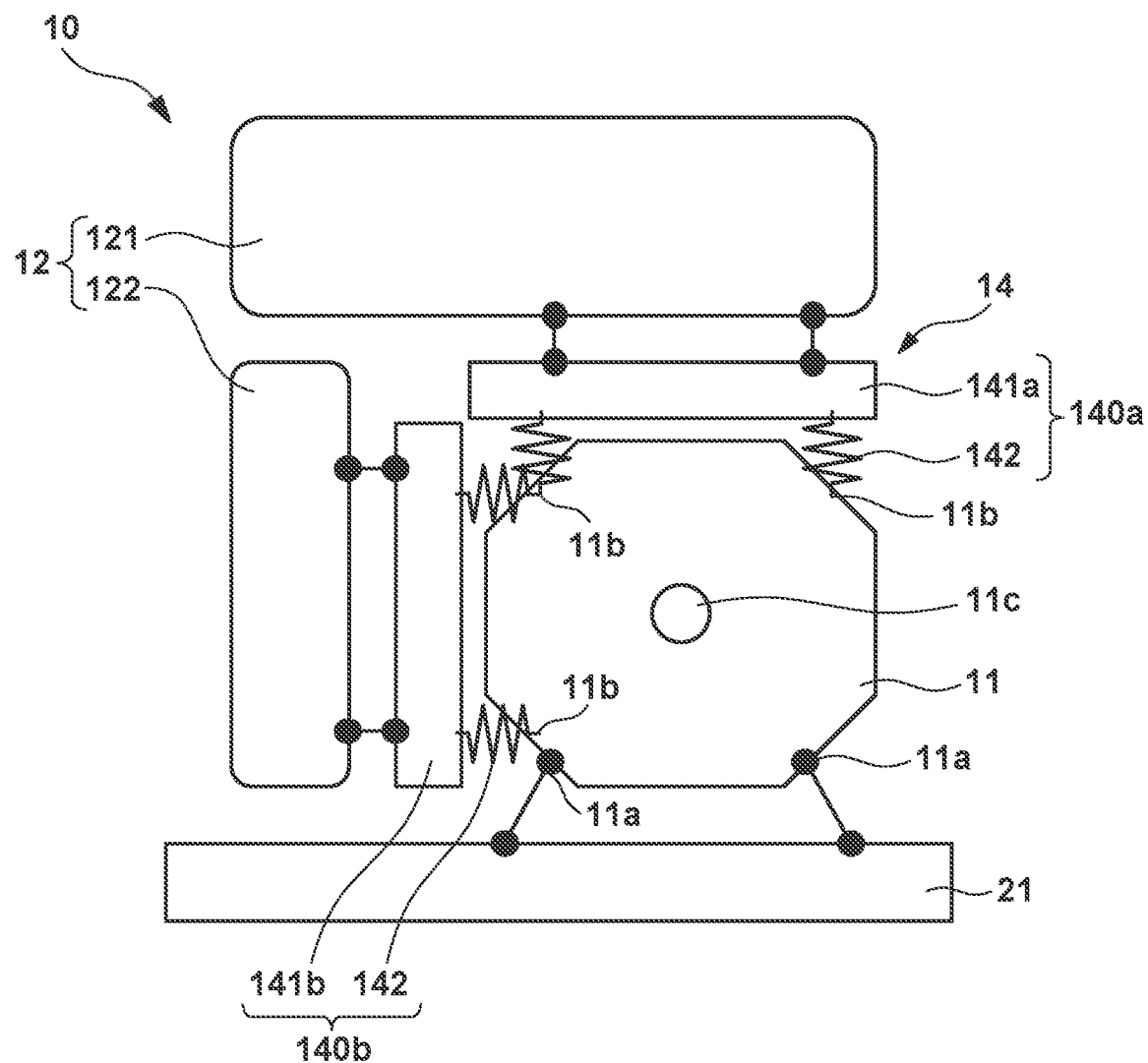
FIG. 7 is a view showing a schematic disposition example (modified example) of the motor, the battery, and the control unit.

Further, in the support member 140 of the present embodiment, the frame 141 is configured to be in an L-shape to fix both the battery 121 and the control unit 122, but the support member 140 is not limited to this. For example, a frame (a support member) may be individually provided for each of the battery 121 and the control unit 122. For example, as shown in FIG. 7, a frame 141a (support member 140a) for fixing the battery 121, and a frame 141b (support member 140b) for fixing the control unit 122 may be provided separately. In this case, the respective frames 141a and 141b are also attached to the second attachment portions 11b of the motor 11 via the elastic members 142. FIG. 7 is a view showing a modified example of the electric power unit 10 of the present embodiment.

Here, in each of the battery 121 and the control unit 122 as the electrical equipment 12, a shape of an attached surface to the motor 11 (support member 140) can be formed in a substantially rectangle. In this case, the battery 121 can be disposed such that a longitudinal direction of the battery 121 is along an arranging direction (predetermined direction) of a plurality of second attachment portions 11b that are provided at the motor 11 to attach the battery 121. Specifically, the battery 121 can be disposed such that the longitudinal direction of the battery 121 is along the arranging direction (Y-direction) of the two second attachment portions 11b which are provided at the upper portion of the motor 11 to attach the battery 121.

Further, the control unit 122 can be disposed such that a longitudinal direction of the control unit 122 is along an arranging direction (predetermined direction) of a plurality of second attachment portions 11b that are provided at the motor 11 to attach the control unit 122. Specifically, the control unit 122 can be disposed such that the longitudinal direction of the control unit 122 is along the arranging direction (Z-direction) of the two second attachment portions 11b which are provided at the side portion of the motor 11 to attach the control unit 122. By disposing the electrical equipment 12 (the battery 121, the control unit 122) in this way, it becomes possible to make the electric power unit 10 more compact.

[Cooling Configuration of Electric Power Unit]

In the electric power unit 10 of the present embodiment, the motor 11 (for example, a stator coil) generates heat, so that as shown in FIG. 3 and FIG. 4A, for example, a cooling fan 11d for cooling the motor is provided at the shaft unit 11c of the motor 11. Thereby, the cooling fan 11d rotates with drive of the motor 11, and takes in gas (air) to an inside of the motor 11 from an outside as shown by an arrow R in FIG. 3, and can cool (air-cool) the motor 11.

In the electric power unit 10, the electrical equipment 12 (the battery 121, the control unit 122) can also generate heat in addition to the motor 11, so that it is necessary to cool the electrical equipment 12 (in particular, the control unit 122). If a mechanism (cooling fan) for cooling the electrical equipment 12 is separately provided from the cooling fan 11d provided at the motor 11 in this case, it can be disadvantageous in terms of device cost (manufacture cost) and compactness. Consequently, the motor 11 of the present embodiment can include a blowout port 11e that blows the gas from the cooling fan 11d to an electrical equipment 12 side.

Figure 8:
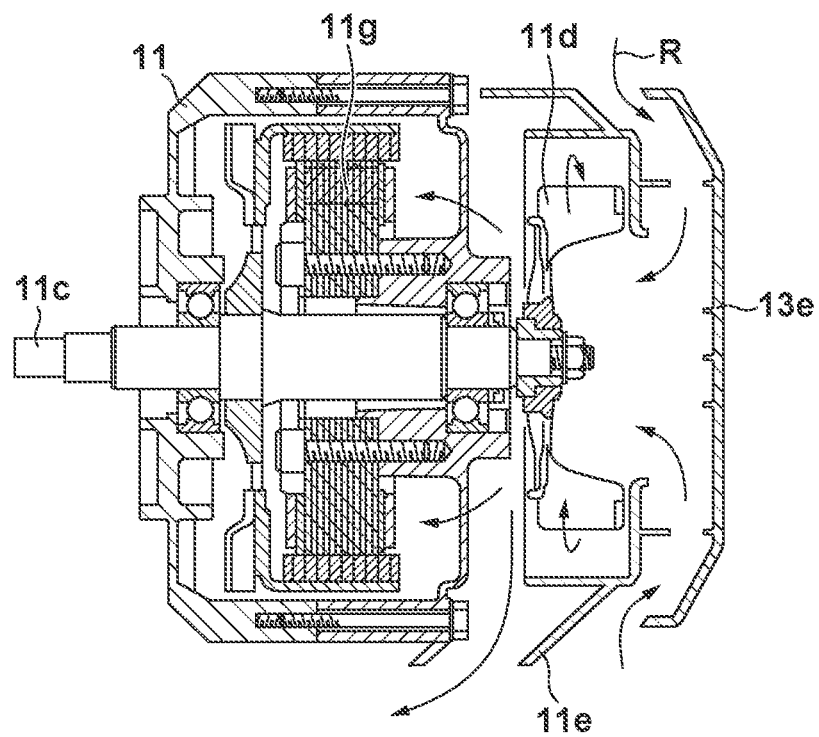
FIG. 8 is a sectional view of the motor.

FIG. 8 is a sectional view of the motor 11. As shown in FIG. 8, the motor can include the shaft unit 11c, a stator coil 11g disposed around the shaft unit 11c, and the cooling fan 11d provided at the shaft unit 11c. When the shaft unit 11c is rotated by energizing the stator coil 11g in the motor 11, the cooling fan 11d rotates with this, and the stator coil 11g can be cooled by applying the air taken in from outside to the stator coil 11g as shown by the arrow R. Further, as shown in FIG. 3 and FIG. 8, the motor 11 is configured to blow out a part of the gas that is taken in from outside by the cooling fan 11d to the electrical equipment 12 side from the blowout port 11e provided in the motor 11. In the present embodiment, the blowout port 11e of the motor 11 can be configured such that the gas is blown out to the control unit 122 as the electrical equipment 12.

As shown in FIG. 3 and FIG. 5A, the control unit 122 has a heat sink 122a configure by a plurality of fins, and is disposed in such a manner that the heat sink 122a is disposed on the motor 11 side. Thereby, the gas that is blown out from the blowout port 11e of the motor 11 passes among the fins of the heat sink 122a, and can efficiently cool the control unit 122. The gas passing among the fins of the heat sink 122a is discharged to outside from an opening 13f that is provided at the −X-direction side of the cover 13 (the cover components 13c and 13d) as shown in FIG. 2D. Here, in the present embodiment, the blowout port 11e of the motor 11 is configured to blow out the gas to the control unit 122, but the blowout port is not limited to this, and may be configured to blow out the gas to the battery 121, or to both the battery 121 and the control unit 122.

Second Embodiment

Figure 9:
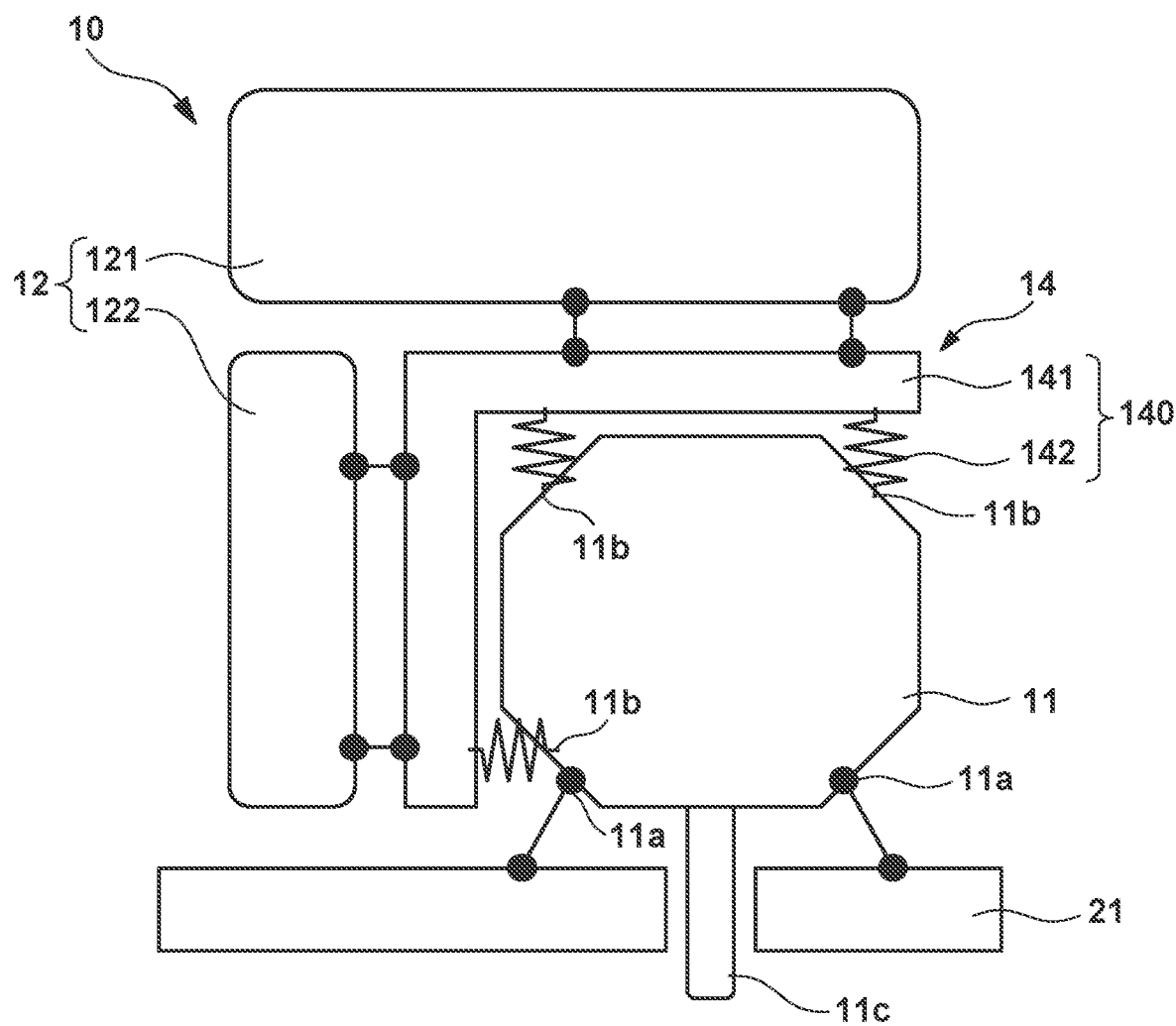
FIG. 9 is a view showing a schematic disposition example (modified example) of the motor, the battery, and the control unit.

A second embodiment according to the present invention will be described. In the first embodiment, the electric power unit 10 in which the shaft unit 11c (rotating shaft) of the motor 11 is parallel with the horizontal direction is described, but as shown in FIG. 9, the shaft unit 11c (rotating shaft) of the motor 11 may be made parallel with the vertical direction. In this case, the motor 11 is provided with the first attachment portions 11a that are attached to the base 21 (mounting object), and the second attachment portions 11b to which the electrical equipment 12 is attached. Only the motor 11 is attached to the base 21 (the mounting object) by the first attachment portions 11a, and the electrical equipment 12 is attached to the motor 11 by the second attachment portions 11b.

Third Embodiment

A third embodiment according to the present invention will be described. The electric power unit 10 is preferably configured such that of the motor 11 and the battery 121, a heavier one is attached to the base 21 (mounting object), and the lighter one is attached to the upper portion or the side portion of the heavier member. By configuring the electric power unit 10 in this way, the center of gravity of the electric power unit 10 is lowered, shake of the electric power unit 10 while working with the working machine 1 is prevented, and working stability can be enhanced.

The case where the motor 11 is heavier than the battery 121 is as described in the first embodiment and the second embodiment. Therefore, hereinafter, a configuration of the electric power unit 10 in a case where the battery 121 is heavier than the motor 11 will be described. Note that the configuration of the present embodiment basically takes over the configuration of the first embodiment other than disposition of the motor 11 and the battery 121, so that explanation of components and configurations similar to those of the first embodiment will be omitted.

Figure 10A:
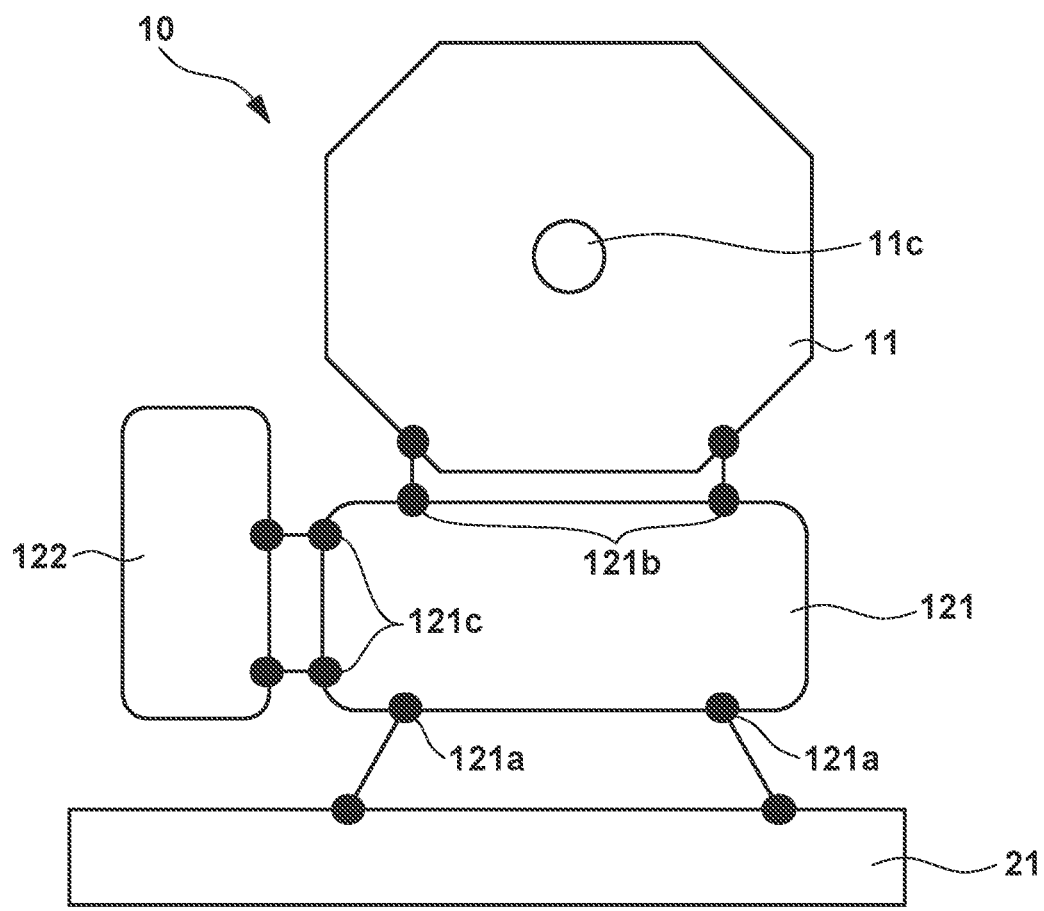
FIG. 10A is a view showing a schematic disposition example (modified example) of the motor, the battery, and the control unit.

FIG. 10A and FIG. 10B are views each showing a schematic disposition example of the motor 11, the battery 121, and the control unit 122 in the case where the battery 121 is heavier than the motor 11. In the disposition example shown in FIG. 10A, the motor 11 is attached to an upper portion of the battery 121, and the control unit 122 is attached to a side portion of the battery 121. On the other hand, in the disposition example shown in FIG. 10B, the motor 11 is attached to the side portion of the battery 121, and the control unit 122 is attached to the upper portion of the battery 121. In either of the disposition examples, only the battery 121 is attached to the base 21 (mounting object), and the motor 11 and the control unit 122 are attached to the battery 121. That is, in the present embodiment, the battery 121 has attachment portions 121a which are attached to the base 21, attachment portions 121b to which the motor 11 is attached, and attachment portions 121c to which the control unit 122 is attached.

Here, the examples shown in FIG. 10A and FIG. 10B each have the configuration in which the control unit 122 is attached to the battery 121, but the present invention may adopt a configuration in which the control unit 122 is attached to the motor 11 instead of the battery 121. Further, though not shown in FIG. 10A and FIG. 10B, the motor 11 and the control unit 122 may be attached to the battery 121 via a support member. The support member can include frames that fix the motor 11 and the control unit 122, and elastic members formed of a rubber, gum or the like.

Summary of Embodiments

The electric power unit of the above described embodiments is an electric power unit (for example, 10) that is mounted on a mounting object (for example, 21), and includes a motor (for example, 11), and electrical equipment (for example, 12) for driving the motor, and the motor has a first attachment portion (for example, 11a) that is attached to the mounting object, and a second attachment portion (for example, 11b) to which the electrical equipment is attached. According to the mode described above, the motor and the electrical equipment are attachable to and detachable from various mounting objects different in shape (for example, a working machine main body) in the state where the motor and the electrical equipment are integrated, so that enhancement in versatility of the electric power unit can be realized. Further, the motor and the electrical equipment can be integrated without considering attachment of the electrical equipment to the mounting object, so that compactness of the electric power unit can be also realized.

Further, the electrical equipment is attached to the second attachment portion of the motor to be separated from the mounting object. According to the mode described above, it is possible to attach and detach the motor and the electrical equipment to and from the mounting object in the state where the motor and the electrical equipment are integrated, without considering attachment of the electrical equipment to the mounting object, so that versatility in the electric power unit can be enhanced.

Further, the electrical equipment is not directly attached to the mounting object. According to the mode described above, it becomes possible to attach and detach the motor and the electrical equipment to and from the mounting object in the state where the motor and the electrical equipment are integrated without considering attachment of the electrical equipment to the mounting object, so that versatility of the electric power unit can be enhanced.

Further, the electrical equipment is attached to the second attachment portion of the motor via a vibration isolation mechanism (for example, 14). According to the mode described above, it is possible to reduce the influence of vibration of the motor and the mounting object (for example, a working machine main body) exerted on the electrical equipment.

Further, the vibration isolation mechanism includes a support member (for example, 140) that supports the electrical equipment swingably to the motor. According to the mode described above, it becomes possible to reduce vibration that is transmitted to the electrical equipment from the motor and the mounting object (for example, the working machine main body).

Further, the support member includes a frame (for example, 141) to which the electrical equipment is fixed, and an elastic member (for example, 142) that is disposed between the frame and the second attachment portion. According to the mode described above, it becomes possible to reduce vibration that is transmitted to the electrical equipment from the motor and the mounting object (for example, the working machine main body) with the simple configuration.

Further, the support member is provided only with respect to a surface of the motor on which the electrical equipment is disposed. According to the mode described above, it becomes possible to achieve reduction in weight of the electric power unit without hindering heat radiation from the motor.

Further, the electrical equipment includes a battery (for example, 121), and a control unit (for example, 122) that controls the motor, and the support member is individually provided for each of the battery and the control unit. By the mode described above, it becomes possible to reduce the vibration that is transmitted to each of the battery and the control unit from the motor and the mounting object (for example, the working machine main body) more effectively.

Further, the electrical equipment includes a battery (for example, 121), and a control unit (for example, 122) that controls the motor, the battery is attached to an upper portion of the motor, and the control unit is attached to a side portion of the motor. According to the mode described above, it becomes possible to prevent shake of the electric power unit during driving by bringing the center of gravity of the entire electric power unit close to the shaft unit (rotating shaft) of the motor, in the horizontal direction. Further, it becomes possible to make the electric power unit more compact in accordance with shapes of the battery and the control unit.

Further, the electrical equipment includes a battery (for example, 121), and a control unit (for example, 122) that controls the motor, the battery is attached to the side portion of the motor, and the control unit is attached to the upper portion of the motor. According to the mode described above, it becomes possible to make the electric power unit more compact in accordance with the shapes of the battery and the control unit.

Further, the motor has a plurality of the second attachment portions that are arranged along a predetermined direction, and the electrical equipment is disposed such that a longitudinal direction of the electrical equipment is along the predetermined direction. According to the mode described above, it becomes possible to make the electric power unit more compact in accordance with the shapes of the battery and the control unit.

Further, the motor includes a cooling fan (for example, 11*d*) that is provided at a shaft unit (for example, 11*c*) to cool the motor, and a blowout port (for example, 11*e*) that blows out gas from the cooling fan to the electrical equipment side. According to the mode described above, it becomes possible to efficiently cool the electrical equipment by the cooling fan provided at the motor without additionally providing a mechanism that cools the electrical equipment.

The electric power unit (for example, 10) of the above described embodiment includes a motor (for example, 11) and a battery (for example, 121), and a lighter member of the motor and the battery is attached to an upper portion or a side portion of a heavier member of the motor and the battery. According to the mode described above, it is possible to lower the center of gravity of the entire electric power unit, and prevent shake of the electric power unit during drive.

Further, a control unit (for example, 122) that controls the motor is further included, and the control unit is attached to the side portion of the heavier member in a case where the lighter member is attached to the upper portion of the heavier member, and is attached to the upper portion of the heavier member in a case where the lighter member is attached to the side portion of the heavier member. According to the mode described above, it is possible to integrate the control unit with the motor and the battery, and it is also possible to realize compactness of the electric power unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electric power unit that is mounted on a mounting object generating vibration, comprising:
    a motor having a rotating shaft; and
    electrical equipment for driving the motor, the electrical equipment including a battery and a control unit configured to control the motor by electric power of the battery,
    wherein the motor has a first attachment portion that is attached to the mounting object, and a second attachment portion to which the electrical equipment is attached, and has an upper surface and a side surface as portions of a surface surrounding the rotating shaft in a circumferential direction of the rotating shaft,
    wherein the motor is rigidly coupled with the mounting object via the first attachment portion,
    wherein the battery is attached to the upper surface of the motor via the second attachment portion, and the control unit is attached to the side surface of the motor via the second attachment portion, and
    wherein the electrical equipment is attached to the second attachment portion of the motor to be separated from the mounting object, via a vibration isolation mechanism.

2. The electric power unit according to claim 1, wherein the electrical equipment is not directly attached to the mounting object.

3. The electric power unit according to claim 1, wherein the vibration isolation mechanism includes a support member that supports the electrical equipment swingably to the motor.

4. The electric power unit according to claim 3, wherein the support member includes a frame to which the electrical equipment is fixed, and an elastic member that is disposed between the frame and the second attachment portion.

5. The electric power unit according to claim 3, wherein the support member is provided only with respect to the upper surface and the side surface of the motor on which the electrical equipment is disposed.

6. The electric power unit according to claim 3, wherein
the support member is individually provided for each of the battery and the control unit.

7. The electric power unit according to claim 1, wherein
the motor has a plurality of the second attachment portions that are arranged along a predetermined direction, and the electrical equipment is disposed such that a longitudinal direction of the electrical equipment is along the predetermined direction.

8. The electric power unit according to claim 1, wherein the motor includes a cooling fan that is provided at the rotating shaft to cool the motor, and a blowout port that blows out gas from the cooling fan to the electrical equipment side.

9. A working machine comprising an electric power unit according to claim 1.

10. The working machine according to claim 9, wherein the mounting object is a compactor including a base fixed to the first attachment portion and a compaction plate provided under the base, the compaction plate being in contact with a ground and configured to be movable up and down.

* * * * *